(12) United States Patent
Dyba et al.

(10) Patent No.: US 8,139,760 B2
(45) Date of Patent: Mar. 20, 2012

(54) ESTIMATING DELAY OF AN ECHO PATH IN A COMMUNICATION SYSTEM

(75) Inventors: Roman A. Dyba, Austin, TX (US);
Perry P. He, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1423 days.

(21) Appl. No.: 11/711,327

(22) Filed: Feb. 27, 2007

(65) Prior Publication Data
US 2008/0205633 A1    Aug. 28, 2008

(51) Int. Cl.
H04M 9/08    (2006.01)
(52) U.S. Cl. .................................. 379/406.14
(58) Field of Classification Search .............. 379/406.14
See application file for complete search history.

(56) References Cited

U.S. PATENT DOCUMENTS

| | | | |
|---|---|---|---|
| 5,245,561 A | 9/1993 | Sugiyama | |
| 5,455,819 A | 10/1995 | Sugiyama | |
| 5,502,747 A * | 3/1996 | McGrath | 375/350 |
| 6,421,377 B1 * | 7/2002 | Langberg et al. | 375/222 |
| 6,483,915 B1 | 11/2002 | Mann et al. | |
| 6,493,448 B1 | 12/2002 | Mann et al. | |
| 6,735,304 B2 | 5/2004 | Hasegawa | |
| 6,771,772 B1 * | 8/2004 | Tanrikulu | 379/406.14 |
| 2003/0235294 A1 * | 12/2003 | Dyba et al. | 379/406.01 |
| 2006/0041403 A1 | 2/2006 | Jaber | |

OTHER PUBLICATIONS

Niedzwiecki,Identification of Nonstationary Stocastic Systems Using Parallel Estimation Schemes,IEEE 1998 p. 258-263.
Takashi Yahagi, An Adaptive Echo Canceller Using Parallel Kalmam Filters, IEEE, 1986 pp. 965-968.
V.A.Margo et al, Multiple Short-Length Adaptive Filters for Time-Varying Echo Cancellation, IEE 1993, pp. I-161-I164.
Niedzwiecki, Multiple-Model Appoach to Finite Memory Adaptive Filtering, IEEE 1992 pp. 470-473.

* cited by examiner

Primary Examiner — Alexander Jamal (57) ABSTRACT

Methods and corresponding systems for reducing an echo signal include assigning a subsegment delay to each of a plurality of subsegment adaptive filters. A send signal and a delayed receive signal are coupled to each of the subsegment adaptive filters, wherein the delayed receive signal is delayed according to a respective subsegment delay. A set of filter coefficients in each of the subsegment adaptive filters are adapted, in parallel, to correspond to a respective subsegment impulse response of a connected system. Each set of filter coefficients is analyzed to produce a pure delay, and the pure delay is used to delay the receive signal for a main adaptive filter. An echo signal replica is produced using the main adaptive filter and an error signal. The echo signal replica is subtracted from the send signal to produce the error signal.

20 Claims, 5 Drawing Sheets

ESTIMATING DELAY OF AN ECHO PATH IN A COMMUNICATION SYSTEM

BACKGROUND

1. Field

This disclosure relates generally to communication systems and equipment, and more specifically, to techniques and apparatus for echo cancellation or echo reduction in a communication system.

2. Related Art

Echo has a major effect on voice quality in telecommunication networks (such as the Public Switching Telephone Network (PSTN) or Packet Telephony (PT) network). The objectionable effect of echo results from a combination of reflections from network components such as two- to four-wire converters (e.g., an impedance mismatch of a hybrid circuit, which is a device used to convert signals from a four-wire communication network interface to a two-wire local subscriber loop, and vice versa), together with signal processing and transmission delay. Echo may cause users difficulty in talking or listening over a telephone connection, and it may also affect the transmission of voiceband data, fax and text.

Echo cancellation is used in a telecommunications network to ensure voice quality through elimination or reduction of electric or line echo from the telecommunications network. Echoes develop, or are created, in an "echo path," which is a circuit that includes all transmission facilities and equipment (including the hybrid and terminating telephone set) connected to the near end of an echo canceller.

An echo canceller is a device that can use adaptive signal processing to reduce or eliminate echoes to allow successful transmission of voice and/or voiceband data (such as modem and facsimile signals). Echo cancelers can be placed in the four-wire portion of a circuit, and reduce (or cancel) the echo by subtracting an estimate of the echo from the returned echo signal. For a more detailed discussion of echo cancelers, see the document entitled "Digital Network Echo Cancelers," which is published by The International Telecommunication Union's (ITU) Telecommunication Standardization Sector (ITU-T) as ITU-T Recommendation G.168.

One characteristic of a good echo canceller is rapid convergence. Convergence can be generally defined as the time the echo canceller needs to produce an estimate of an echo signal and reduce the echo signal below a threshold. Adaptive signal processing circuits may be used in an echo canceller to remove or facilitate removal of the echo signal. The adaptive signal processing circuits unfortunately may increase the complexity and computational costs associated with rapid and accurate echo signal identification and cancellation or removal.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
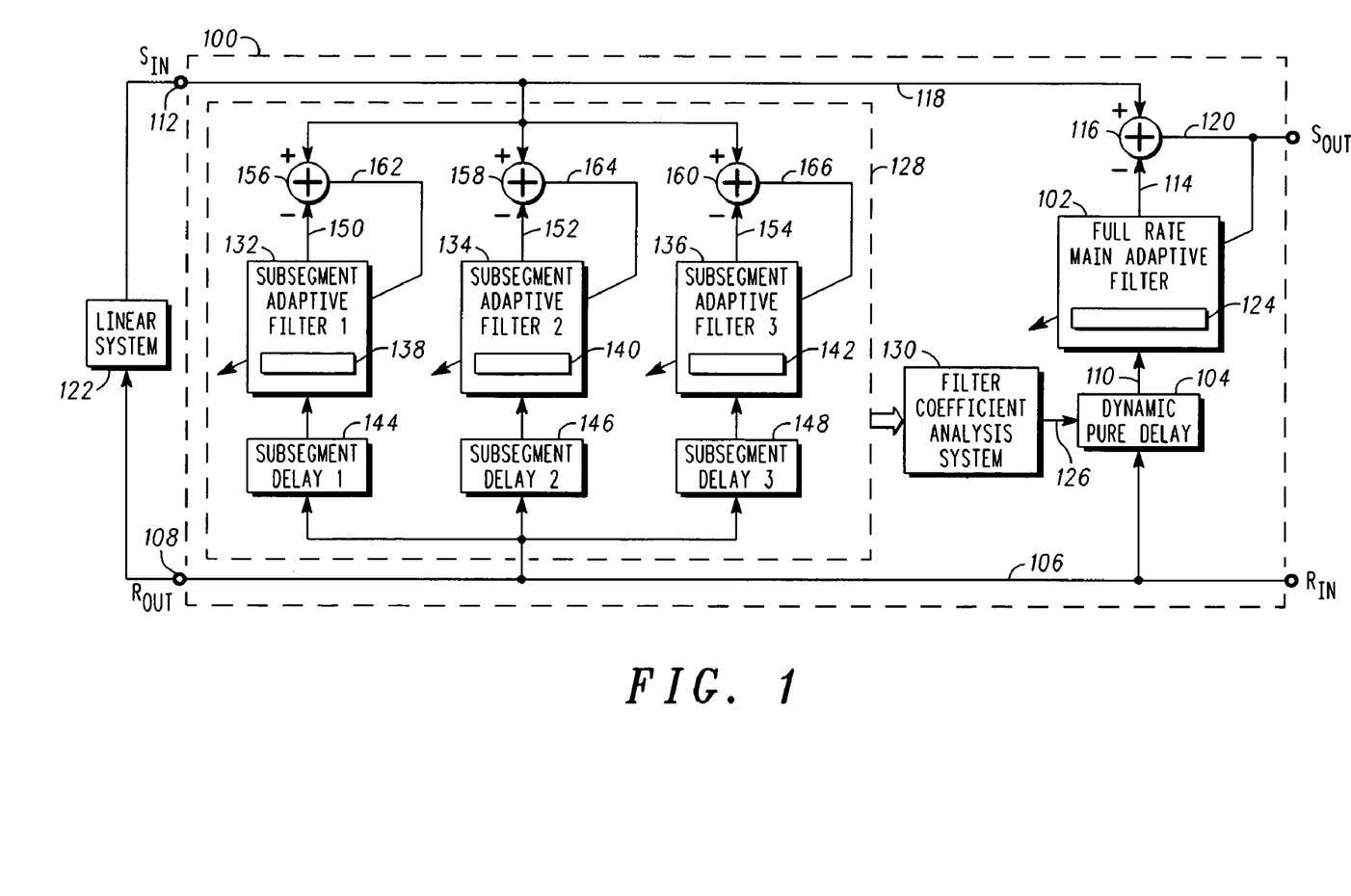
FIG. 1 is a high-level block diagram of a system for reducing an echo signal in accordance with one or more embodiments.

Referring to FIG. 1, a high-level block diagram of portions of a system for reducing echo signals in accordance with one or more embodiments will be briefly discussed and described. Note that many of the processes and functional blocks described hereinafter operate in the digital domain using digital data representing speech or other data transmitted over a communication network. As shown (note that not all major elements/subsystems of an echo canceller system are depicted in FIG. 1), echo reduction system 100, which can also be referred to as an echo canceller, includes full rate main adaptive filter 102 coupled to dynamic pure delay 104. Dynamic pure delay 104 has an input coupled to receive signal 106 (which is represented schematically at signal path 106, as are other "signals" similarly referred to herein with reference to FIGS. 1, 2, and 3), which also may be known as the "$R_{in}$" signal, as used in ITU-T Recommendation G.168, and other similar documents. An output of dynamic pure delay 104 provides a delayed receive signal 110 to full rate main adaptive filter 102. Dynamic pure delay 104 can be implemented in one embodiment with a memory buffer, such as a first-in-first-out (FIFO) memory, wherein digital samples are temporarily stored and then recalled after a selective delay time.

An output of full rate main adaptive filter 102 provides an estimated echo replica or estimated echo signal 114 to an inverting input of adder 116. A non-inverting input of adder 116 is coupled to send signal 118. The output of adder 116 is error signal 120, which is also known as the output signal ("Sout") of echo canceller 100 (note that some embodiments include a non-linear processor (NLP, which is not shown in the figures), and that error signal 120 is equivalent to Sout only if the NLP is disabled). Error signal 120 is also coupled to an input of full rate main adaptive filter 102 for use as a feedback signal.

In operation, send signal 118, which can be received at an input 112 referred to as "$S_{in}$", is an output of linear system 122. Send signal 118 can include a signal produced by a local user or other near end subscriber system, together with an echo signal. An echo signal can be an undesired, delayed copy (e.g., delayed by about 20-30 milliseconds, which is the range for which humans begin to recognize the delayed signal as an echo. In some embodiments, the echo delay can be more, even extending to hundreds of milliseconds for intercontinental calls), or a modified delayed copy, of receive signal 106. Receive signal 106, which is also coupled to linear system 122 (e.g., the signal that may be referred to as "$R_{out}$" 108; note that in many of practical implementations of echo cancelers $R_{out} = R_{in}$; however, the ITU-T G.168 Recommendation maintains a level of abstraction and makes a distinction between these two signals), can be a signal received via a network, such as the Public Switched Telephone Network (PSTN), or other similar network. Receive signal 106 may also be referred to as a "far end signal." Send signal 118 can also be referred to as a "cancelled end signal." The "echo path" can be defined as the signal path (or transmission path) of the echo, which is the transmission path between $R_{out}$ 108 and $S_{in}$ 112 of echo canceller 100 (and 200 and 300 in alternate embodiments). Or stated alternatively, the transmission path between the linear system input and its output.

In one embodiment, linear system 122 is comprised of network elements (e.g., network elements that convert a four-wire connection to a two-wire connection, which are typically called a hybrid or a hybrid circuit, and other network elements that contribute to a relatively large "pure delay" of the input and output signals). The echo signal is typically caused by an impedance mismatch between network elements, which includes impedance mismatches between electrical cables connecting the hybrid circuits and other network elements, and impedance mismatches in cables connecting the voice terminals or telephones sets, and mismatches with the input impedance of voice terminals. The echo signal can also be caused by, or changed by, electro-acoustical coupling between speakers and microphones in voice terminals (e.g., telephone sets). Additionally, echoes can be caused or changed by adding a bridged line or performing call forwarding in a call-in-progress scenario.

To remove the echo signal in send signal 118, echo reduction system 100 produces estimated echo replica 114, which is then subtracted from send signal 118 as it is added from the inverting input of adder 116. The output of adder 116, error signal 120, should not contain the undesired echo effects if main adaptive filter 102 has output the correct estimated echo replica 114, where the echo replica is correctly located in time (e.g., correctly estimating pure delay) and in the estimation of the echo portion of send signal 118 (e.g., correctly estimating the waveform of the echo signal).

Full rate main adaptive filter 102 estimates the waveform of the echo signal by adapting a set of filter coefficients 124 (shown schematically as a box within full rate main adaptive filter 102). In one embodiment, filter coefficients 124 can be multiplying factors (e.g., a vector of factors, which are usually comprised of real numbers) of a well known adaptive filter that uses a taped-delay-line finite impulse response (FIR) filter and a reference-matching quality assessment block (e.g., adder 116 and error signal 120). These coefficients adapt to describe an impulse response of full rate main adaptive filter 102, which impulse response should adapt to, or converge to, the impulse response of linear system 122 according to a given adaptation algorithm of choice. The convergence time can be defined as the interval between the instant a receive signal 106 is applied to the $R_{in}$ port of echo canceller 100 with the estimated echo path impulse response (e.g., filter coefficients 124) initially set to zero, and the instant the returned echo level in error signal 120 reaches a defined level. The defined level need not be constant—it can be a function of the echo return loss (ERL) or other measurements of the linear system.

As full rate main adaptive filter 102 is adapted, coefficients 124 are changed so that estimated echo replica 114 converges with the echo signal in send signal 118. These adaptive changes can be implemented via the well known Least Mean Squares (LMS) algorithm, which is computationally efficient and has a relatively low cost in terms of the number of additions and multiplication for relatively good convergence properties.

A short convergence time is important to the overall voice quality of the echo canceller and, specifically, to users of error signal 120, which is the output, $S_{out}$, of echo reduction system 100. When the convergence time is short, communications system users may initially hear an echo, but the system quickly learns or adapts as the filter converges and removes more and more of the echo signal. One way to reduce the time to filter convergence is to provide full rate adaptive filter 102 with a delayed receive signal 110 that has been delayed by a time just shorter than the occurrence of an earliest (i.e., first) echo signal. This delay may be referred to as a "pure delay." The pure delay can also be defined as the delay from the $R_{out}$ port 108 to the $S_{in}$ port 112 due to the delays inherent in the near-end echo path transmission facilities (e.g., linear system 122), not including dispersion time due to the network elements, and wherein the transit time directly across the hybrid is assumed to be zero. By providing the proper pure delay, the algorithm for adapting coefficients in full rate main adaptive filter 102 can be more efficient because the number of coefficients that are adapted in filter 102 can be reduced (e.g., the filter length can be reduced), and convergence can occur in a shorter time period.

To quickly estimate the pure delay, echo reduction system 100 can use subsegment adaptive filters 128 and filter coefficient analysis system 130, in accordance with one or more embodiments. Subsegment adaptive filters 128 includes two or more subsegment adaptive filters 132, 134, and 136, arranged in a parallel structure where each is used to adapt to a different portion of the entire echo path impulse response, which portion is within a subsegment of the entire echo path impulse response domain. The echo path impulse response domain can also be referred to as an echo path coverage time, an echo path delay time, or the length of an impulse response of an echo path, or the echo path capacity. Each subsegment adaptive filter 132, 134, and 136 includes, respectively, a set of subsegment coefficients 138, 140, and 142. Each set of subsegment coefficients 138, 140, and 142, is adapted to a portion of the echo path impulse response so that each set is converging to describe a portion of an impulse response of a connected system (e.g., linear system 122). Thus, an echo path coverage (e.g. the domain of the echo path impulse response) is partitioned into two or more subsegments or windows of time, and such partitions are assigned or associated with one of the subsegment adaptive filters (e.g. subsegment adaptive filters 132, 134, and 136). First subsegment adaptive filter 132 adapts first set of coefficients 138 in response to send signal 118 and receive signal 106 delayed by first delay 144, and similarly second subsegment adaptive filter 134 adapts second set of coefficients 140 in response to send signal 118 and receive signal 106 delayed by second delay 146, and so on. Note that in some embodiments first delay 144 can be set to zero.

Each subsegment adaptive filter 132, 134, and 136 can receive an input from a respective subsegment delay, such as subsegment delays 144, 146, and 148, each of which outputs a delayed version of receive signal 106. As described above, the delays can be implemented using digital memory buffers. Each subsegment adapter filter 132, 134, and 136 can have a filter length that is a portion of the echo path coverage. The combination of the delayed version of receive signal 106 and the selected length of each subsegment adaptive filter work together to configure the subsegment adaptive filters to find an echo signal (if one exists) in the respective subsegments or windows of the echo path coverage. For example, as in FIG. 1, if there are three subsegment adaptive filters, the length of each sub segment adaptive filter can be one third of the delay path time if there is no overlap between the subsegments. In some embodiments, there can be advantages to having the subsegments overlap, which means that each subsegment can be somewhat longer (or greater) than the echo path coverage divided by the number of segments.

After a period of adaptation, each subsegment adaptive filter can output a subsegment echo replica 150, 152, and 154, which are signals containing an estimated echo that can occur in the respective subsegment of the echo path coverage. If there is not an echo that occurs in the subsegment, the estimated echo will resemble noise (i.e., a noisy irregular pattern without clearly definable or identifiable clusters of higher values or higher energy). Subsegment echo replicas 150, 152, and 154 can be input to an inverting input of adders 156, 158, and 160 to produce subsegment error signals 162, 164, and 166. The subsegment error signals are feedback to their respective subsegment adaptive filters so that adaptation algorithms can adapt subsegment coefficients 138, 140, and 142 to subsegments of the echo path impulse response. Note that in some embodiments, subsegment delay 144 may be set to zero, in which case subsegment delay 144 need not be shown or included in the block diagram.

After the period of time for adapting subsegment coefficients 138, 140, and 142, the sets of subsegment coefficients are passed to filter coefficient analysis system 130. Filter coefficient analysis system 130 examines each set of subsegment coefficients 138, 140, and 142 and determines whether an echo signal (or more than one echo signal) is present in one or more of the subsegments. In one embodiment, this can be implemented by searching for a maximum coefficient in each set of subsegment coefficients 138, 140, and 142. Further analysis of the subsegment coefficients can be used to determine whether the subsegment coefficients have converged on an echo signal or whether the subsegment coefficients are the result of noise (i.e., no echo) in the subsegment associated with the subsegment adaptive filter. If an echo is present in the subsegment, several of the coefficients will have significant non-zero values (e.g., values that exceed a threshold, and that may have other predetermined characteristics) as a result of the adaptation.

Once an echo signal has been identified, filter coefficient analysis system 130 determines a pure delay associated with the echo. The pure delay 126 is then passed to dynamic pure delay 104 for producing delayed receive signal 110, which is used in full rate main adaptive filter 102 for reducing the echo signal.

Figure 2:
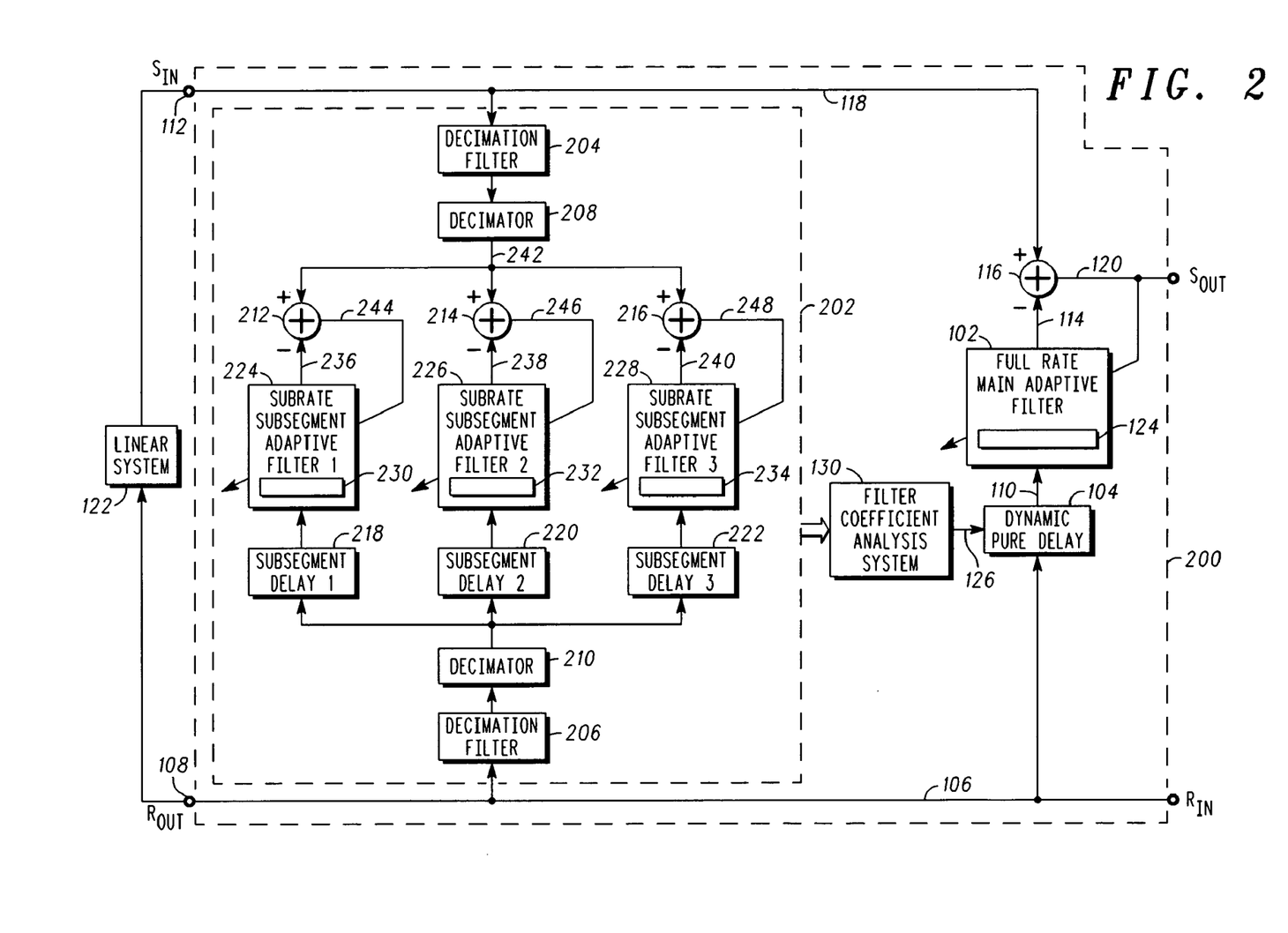
FIG. 2 is a high-level block diagram of a system for reducing an echo signal that includes subrate subsegment adaptive filters in accordance with one or more embodiments.

Referring to FIG. 2, there is depicted a high-level block diagram of a system for reducing an echo signal that includes subrate subsegment adaptive filters in accordance with one or more embodiments. Note that many of the functional blocks in FIG. 1 are also used in the embodiment shown in FIG. 2. For example, similarities with FIG. 1 include receive signal 106 coupled to linear system 122, and send signal 118 output by linear system 122. Full rate main adaptive filter 102 is similarly coupled to dynamic pure delay 104 and adder 116. Adder 116 receives estimated echo replica 114 in the inverting input and send signal 118 in the non-inverting input, and outputs error signal 120. Filter coefficient analysis system 130 receives sets of adapted coefficients and outputs pure delay 126 to dynamic pure delay 104.

In the embodiment shown in FIG. 2, subrate subsegment adaptive filters 202 are different from subsegment adaptive filters 128 shown in FIG. 1. In FIG. 2, subrate subsegment adaptive filters 202 operate on decimated data (i.e., reduced rate data), and thus are able to operate faster and more efficiently to adapt subsegment coefficients in subsegments of the echo path coverage or echo path impulse response domain. Within subrate subsegment adaptive filters 202, decimation filters 204 and 206 each have an input coupled to send signal 118 and receive signal 106, respectively. The purpose of decimation filters 204 and 206, which can also be referred to as "anti-aliasing filters," is to limit the signal spectrum, so that a downsampling process (e.g., a process performed by a decimator, which can also be called a "downsampler") does not contribute to aliasing. The relationship between a signal spectrum width and a sampling rate is known in the art as the "Sampling Theorem," or the "Nyquist-Shannon Sampling Theorem." Since a realizable filter cannot limit the signal spectrum in an absolute sense, some traces of aliasing caused by the decimation process always exist, but they can be practically ignored if they are below an acceptable threshold (and/or comparable in terms of their energy to the noise that is almost always present in the system under consideration).

The outputs of decimation filters 204 and 206 are coupled to an input of decimators 208 and 210, respectively. A decimator (which can also be referred to as a "downsampler" or "subsampler") is a functional entity (which can be realized practically using a hardware solution, or a software solution, or both) that receives a stream of signal samples $\{x_n, n=\ldots, -1, 0, 1, 2, 3, \ldots\}$ and outputs a stream of signal samples wherein only some belong to the set $\{x_n\}$. Downsampling is commonly a periodic operation with a constant downsampling factor (usually denoted by D or M). The output stream, $\{y_n\}$, can be related to the input stream as follows: $y_n = x_{n+D}$. In one embodiment wherein D=2, the output samples are equal to every second input sample (while the time distance between the adjacent decimated samples of stream $\{y_n\}$ is twice as great comparing to $\{x_n\}$). Other practical viable decimation rates include D=2, 4, 8, 16.

Benefits of using decimation (i.e., with D>1) to reduce the sampling rate of receive signal 106 and send signal 118 include: (a) using less computational power (i.e., using fewer CPU cycles) to adapt subsegment filter coefficients in the subrate subsegment adaptive filter; (b) reducing component count (such as by reducing the number of FIR filter taps) and complexity of implementing a subrate subsegment adaptive filter that covers the same echo path segment (i.e., the complexity reduction can include simpler provisions regarding the stability of the adaptive filter); (c) reducing numerical rounding errors (which is particularly important when numerical operations are implemented using fixed-point arithmetic); and (d) increasing the filter convergence speed, which contributes to better voice quality of the echo canceller system.

The output of decimator 208, which is decimated send signal 118, is coupled to a non-inverting input of adders 212, 214, and 216. The output of decimator 210, which is a decimated receive signal 106, is coupled to inputs of subsegment delays 218, 220, and 222. As a result of the decimation of receive signal 106 and send signal 118, subrate subsegment adaptive filters 224, 226, and 228 adapt subsegment coefficients 230, 232, and 234, respectively, using decimated data in order to speed convergence to any echo signals that may exist in each respective subsegment.

Subrate subsegment adaptive filters 224, 226, 228 each output estimated echo signal 236, 238, and 240. Estimated echo signals 236, 238, and 240 are, respectively, subtracted from decimated send signal 242 in order to produce subsegment error signals 244, 246, and 248. The subsegment error signals (e.g., 244, 246, 248) are used to continue the adaptation of the subrate subsegment adaptive filters (e.g., 224, 226, 228). After an adaptation period, sets of coefficients adapted to the corresponding subsegments of the subrate echo path impulse response are sent to filter coefficient analysis system 130, which operates as described above to locate any echo signals and determine a pure delay 126 to pass to dynamic pure delay 104.

Figure 3:
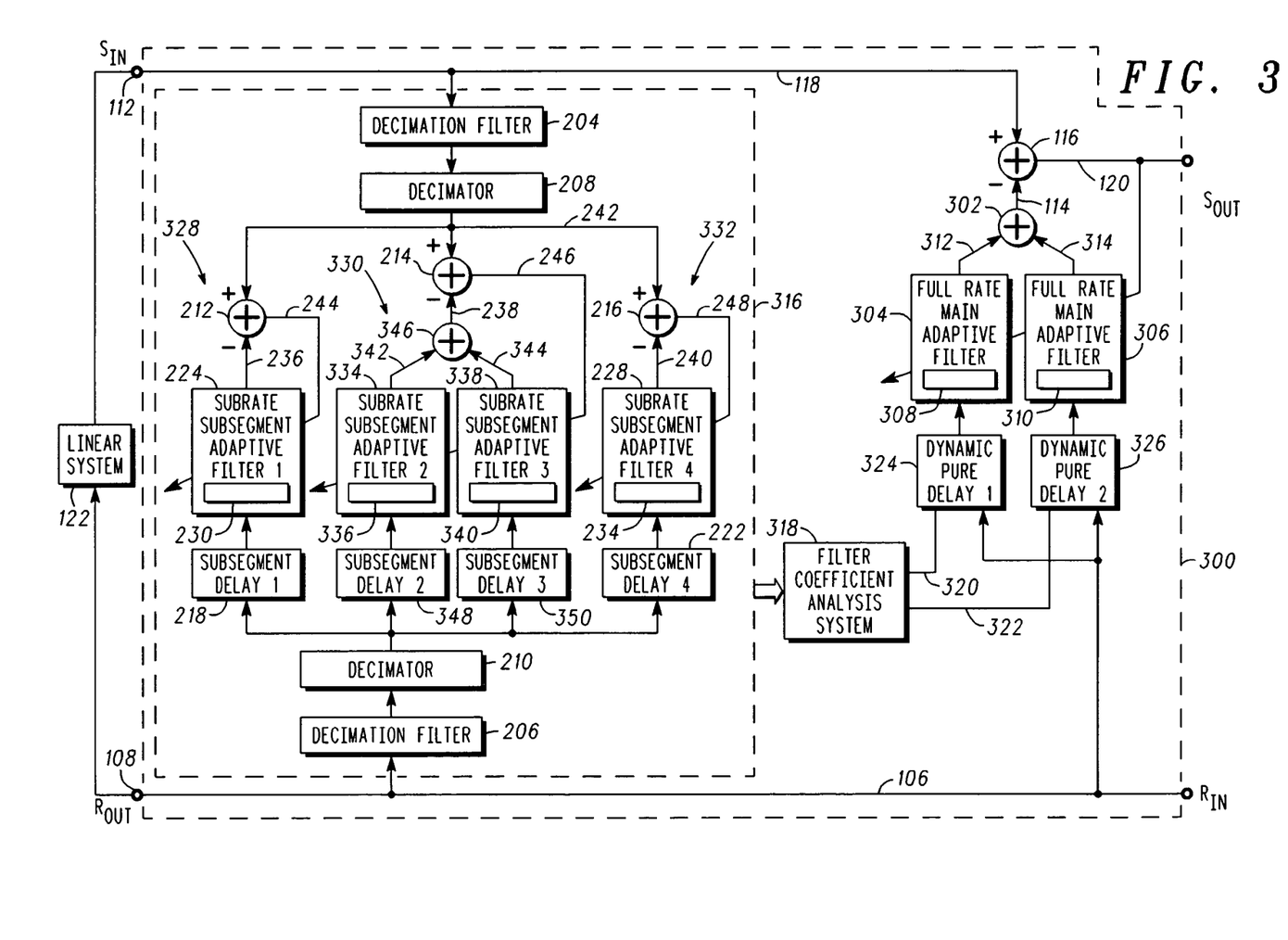
FIG. 3 is a high-level block diagram of a system for reducing multiple echo signals in accordance with one or more embodiments.

Referring to FIG. 3, there is depicted a high-level block diagram of a system for reducing multiple echo signals in accordance with one or more embodiments. As illustrated, echo reduction system 300 includes many functional blocks that are similar to those depicted in FIGS. 1 and 2. For example, receive signal 106 is coupled to linear system 122, and send signal 118 is output by linear system 122. Adder 116 receives estimated echo replica 114 in the inverting input and send signal 118 in the non-converting input, and outputs error signal 120.

In the embodiment shown, echo reduction system 300 is adapted to reduce multiple echo signals in the echo path domain. Note that echo replica signal 114 is the output of adder 302, which adds the outputs of full rate main adaptive filters 304 and 306. Both full rate main adaptive filters 304 and 306 receive error signal 120 for feedback, and each respectively adapts filter coefficients 308 and 310. Filter outputs 312 and 314 can include estimated echo signals for one, two, or more echo signals, which echo signals have been located by subrate subsegment adaptive filters 316 and filter coefficient analysis system 318. In this embodiment for reducing multiple echo signals, filter coefficient analysis system 318 outputs two or more pure delay values 320 and 322, which are sent to respective dynamic pure delays 324 and 326.

Dynamic pure delays 324 and 326 delay receive signal 106 and output delayed receive signals that are used in full rate main adaptive filters 304 and 306, respectively. As described above, the delays can be implemented using digital memory buffers. Full rate main adaptive filters 304 and 306 adapt coefficients 308 and 310 according to echo signals located in respective subsegments of the echo path impulse response. In one embodiment, the full rate main adaptive filter lengths can be 12 ms. The lengths of the filters can vary from implementation to implementation, and can be, for example, as small as 4 ms in a low cost embodiment, and can, for example, be as large as 16 ms in a higher cost, higher quality embodiment.

In the example shown in FIG. 3, subrate subsegment adaptive filters 316, includes three branches 328, 330, and 332 of subrate subsegment adaptive filters, wherein each branch adapts filter coefficients to selected portions or subsegments of the subrate echo path impulse response. For example, if the echo path coverage is divided into two subsegments, branch 328 can use subrate subsegment adaptive filter 224 to adapt filter coefficients 230 to echo signals found in a first subsegment, while branch 332 can use subrate subsegment adaptive filter 228 to adapt filter coefficients 234 to echo signals found in a second subsegment.

However, if there are two reflections (i.e., two individual echoes) in send signal 118, with one echo signal in the first subsegment and another echo signal in the second subsegment, filter coefficients 230 and 234 will not completely converge because the filter does not have a filter length that encompasses both echo signals.

In order to find two echo signals spread over two subsegments, branch 330 includes two (or more) subrate subsegment adaptive filters, such as subrate subsegment adaptive filters 334 and 338, wherein one of the adaptive filters (e.g., subrate subsegment adaptive filter 334) adapts filter coefficients (e.g. filter coefficients 336) to echo signals in the first subsegment, and the other adaptive filter (e.g., subrate subsegment adaptive filter 338) adapts filter coefficients (e.g. filter coefficients 340) to echo signals in the second subsegment. Subrate subsegment adaptive filter 334 produces estimated echo signal 342, and subrate subsegment adaptive filter 338 produces estimated echo signal 344. Both estimated echo signals 342 and 344 are added in adder 346 to produce estimated echo signal 238. Estimated echo signal 238 is sent to the inverting input of adder 214, which adds the signal with decimated send signal 242 to produce subsegment error signal 246. Subsegment error signal 246 is used as feedback in both subrate subsegment adaptive filters 334 and 338 to adapt filter coefficients.

In branch 330, subsegment delays 348 and 350 delay the decimated receive signal output by decimator 210 in order to set or configure the subsegments processed by subrate subsegment adaptive filters 334 and 338, respectively. In an embodiment such as FIG. 3 that uses two subsegments, subsegment delay 348 can be the same delay provided by subsegment delay 218, and subsegment delay 350 can be the same delay provided by subsegment delay 222. In some embodiments, subsegment delay 218 and subsegment delay 348 can be set to zero in a scenario where the pure delay range of interests includes small values, such as 1 ms or less. In some embodiments, subsegments associated with subsegment delays 348 and 350 need not be adjacent to one another. For example, in an embodiment partitioned into three subsegments, delays 348 and 350 can be used to configure the first and third subsegments as the subsegments processed by subrate subsegment adaptive filters 334 and 338.

Figure 4:
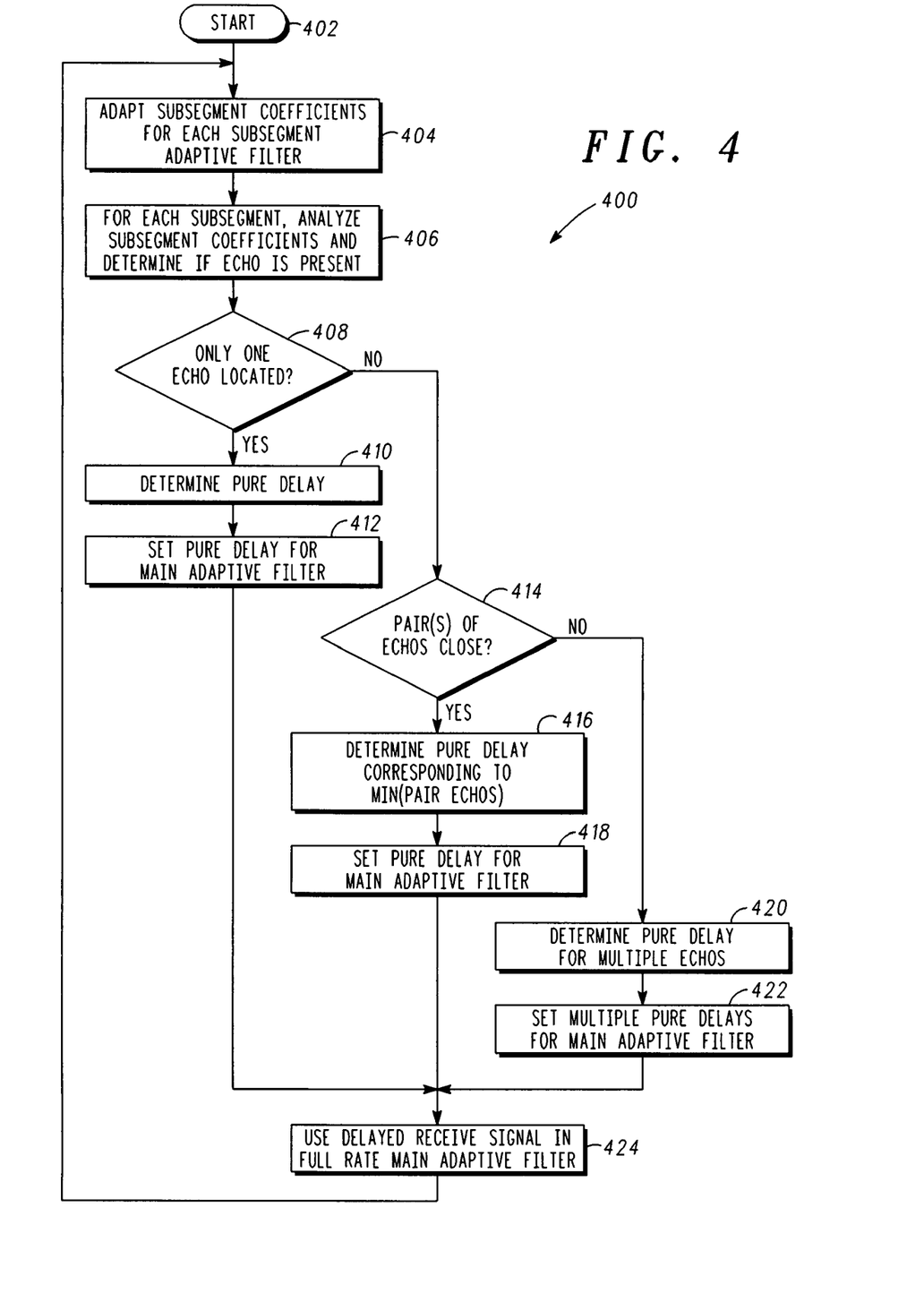
FIG. 4 is a flowchart of a process of determining and setting a pure delay in a system for reducing echo signals in accordance with one or more embodiments.

Referring to FIG. 4, there is depicted a high-level flowchart 400 of processes that can be executed by echo reduction systems 100, 200, and 300 or other systems with appropriate functionality in accordance with the one or more embodiments. As shown, process 400 begins at 402, and thereafter passes to 404, wherein the process adapts subsegment coefficients for each subsegment adaptive filter. In one embodiment, a plurality of subsegment adaptive filters (e.g. subsegment adaptive filters 132, 134, and 136) operate in parallel to adapt respective subsegment coefficients (e.g. subsegment coefficients 138, 140, and 142) to estimate a response of a connected system (e.g., linear system 122) with respect to an associated subsegment of an echo path impulse response domain (e.g. a period of time in which an echo is expected to occur).

Figure 5:
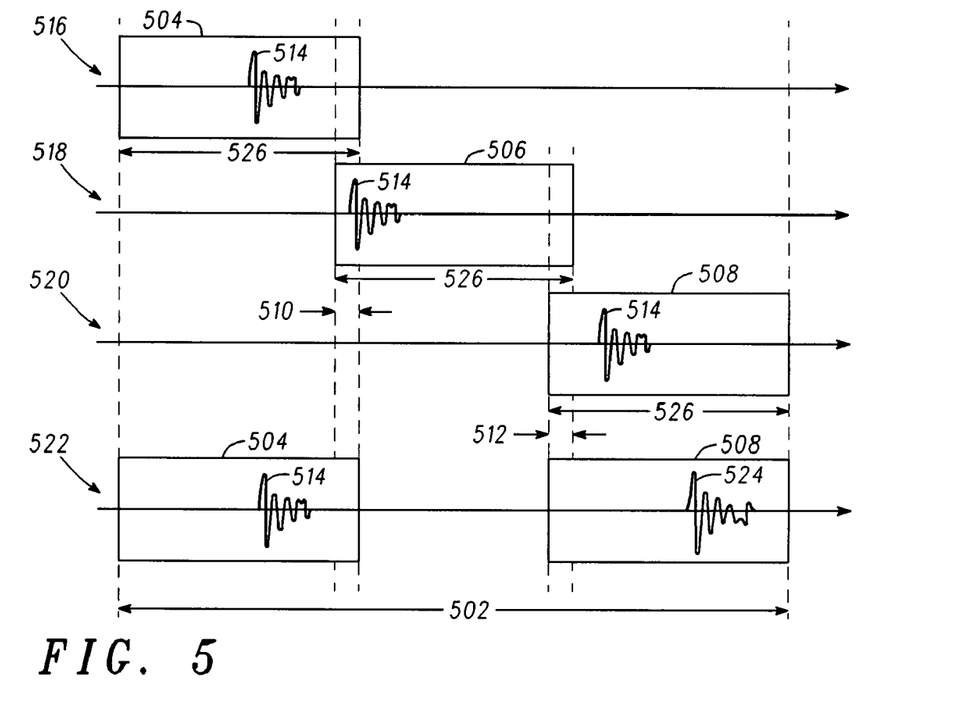
FIGS. 5 and 6 are schematic representations of echo signals in one or more subsegments of an echo path impulse response domain in accordance with one or more embodiments.

As an aide to visualizing echo signals, the echo path impulse response domain, and the partitioned subsegments, FIG. 5 shows various schematic representations of the echo path impulse response domain and timelines that include echo signals in various subsegments of the echo path impulse response domain. The period of time referred to as the echo path impulse response domain (e.g., the coverage of the echo canceller) is shown at 502. In one embodiment, echo path impulse response domain 502 is partitioned or divided into three subsegments-first subsegment 504, second subsegment 506, and third subsegment 508. If subsegments 504, 506, and 508 are all equal to one third of echo path impulse response domain 502, they would not overlap. In the embodiment shown in FIG. 5, subsegments 504, 506, and 508 overlap, as indicated at overlap 510 and 512. As described more completely below, there can be advantages to having overlapping subsegments.

In FIG. 5, three subsegments 504, 506, and 508 are shown substantially equal in length. However, in other embodiments, there may be more or less than three subsegments, and the subsegments may have different lengths.

Echo signals are schematically depicted in FIG. 5 at 514. In the example shown on timeline 516, echo signal 514 occurs within first subsegment 504. Similarly, in the examples on timelines 518 and 520, echo signal 514 occurs in second subsegment 506 and third subsegment 508, respectively. Note that substantially the entire duration of echo signal 514 occurs within a subsegment (e.g., 504, 506, and 508). If this is the case, subsegment coefficients (e.g. 138, 140, and 142, see FIG. 1) can be more completely adapted to echo signal 514, which can mean that the coefficients will converge more completely than when echo signal 514 is not completely within a subsegment.

In one embodiment, adapting coefficients in the subsegment adaptive filter can be implemented using any one of several known algorithms for adapting filter coefficients, such as the least mean square (LMS) algorithm, the Normalized Least Mean Squares (NLMS) algorithm, the Proportionate Normalized Least Mean Squares (PNLMS) algorithm, the Affine Projection (AP) algorithm, the Recursive Least Squares (RLS) algorithm, or the like.

In FIG. 5, the example shown on timeline 522 includes echo signal 514, which is a first echo signal (e.g., first in time), and echo signal 524, which is a second echo signal. In this example, first echo 514 falls within first subsegment 504, and second echo 524 falls within third subsegment 508. Cases where there are multiple echoes are discussed more completely below.

Figure 6:
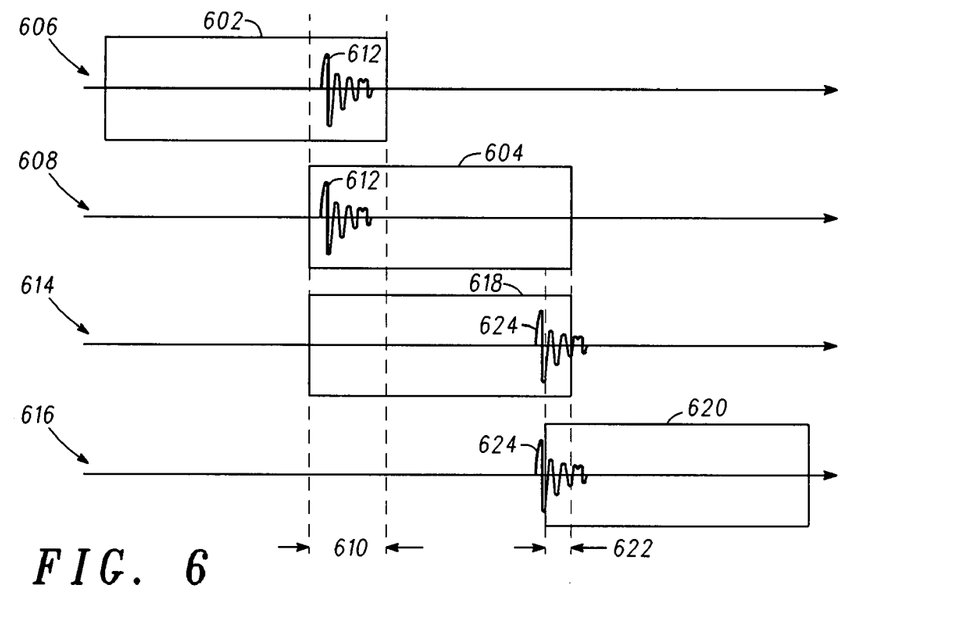

In FIG. 6, there is depicted subsegments 602 and 604 on timelines 606 and 608, respectively, wherein the subsegments have an overlap 610. In this example, echo signal 612 is completely within both subsegments 602 and 604. To increase the probability of complete convergence in one or more of the parallel subsegment adaptive filters, overlap 610 is chosen to be longer than the length of an expected echo signal (e.g., echo signal 612).

In contrast, timelines 614 and 616 show subsegments 618 and 620, which have overlap 622. Echo signal 624 is not completely within either subsegment 618 or 620 because overlap 622 is shorter than echo signal 624, and echo signal 624 is located over the end of subsegment 618 and before the beginning of subsegment 620. When an echo signal is not completely, or substantially entirely, within a subsegment, the filter coefficients will not completely converge in either subsegment adaptive filter.

Referring back to the flowchart FIG. 4, after adapting subsegment coefficients at 404, the process analyzes the subsegment coefficients of each subsegment to determine if an echo signal is present, as shown at 406. In one embodiment, the analysis of a set of subsegment coefficients includes finding a maximum subsegment coefficient within the set. The maximum subsegment coefficient can be used to indicate the beginning (or nearly the beginning) of an echo signal. If all subsegment coefficients in the set are randomly distributed small values, the process can assume that there is no echo signal in the associated subsegment.

In some embodiments, processes for determining the presence of an echo signal can include performing short term and long term estimations of quantities, such as the Echo Return Loss (ERL), or a subrate ERL (if the adaptive filter is processing subrate signals), or an Echo Return Loss Enhancement (ERLE), or performing local peak-to-average ratio (PAR) calculations using values of the adaptive filter coefficients, and other similar computations and methods of analysis that can be used to distinguish coefficients that indicate a correlation of a signal in $R_{in}$ 106 with an echo signal in $S_{in}$ 118 from coefficients that indicate no correlation.

Next, the process determines if only one echo signal was located at 406, as depicted at 408. If only one echo signal was located, the process determines the pure delay, as illustrated at 410. In one embodiment, this can be implemented by subtracting an offset value from the time indicated by the maximum valued subsegment coefficient. Subtracting this offset will ensure that the pure delay indicates a time shortly before the echo signal, and that none of the echo signal begins before the pure delay, which would cause full rate main adaptive filter 102 to omit the initial portion of the meaningful segment of the echo path impulse response.

Once the pure delay is determined, the process sets the pure delay for the main adaptive filter (e.g., full rate main adaptive filter 102), as illustrated at 412. In one embodiment, this can be implemented by passing a pure delay value 126 from filter coefficient analysis system 130 to dynamic pure delay 104 (see FIG. 1). Setting the pure delay for the full rate main adaptive filter configures the delay so that the filter adapts filter coefficients in the relevant portion of the echo path impulse response domain, thereby enabling the filter to converge faster and be implemented with a shorter length adaptive filter (e.g., a "sparse" adaptive filter, which is a filter having a length shorter than the actual echo path impulse response length that includes the pure delay portion).

After setting the pure delay for the main adaptive filter, the process uses the delayed receive signal (i.e., receive signal 106 delayed by the pure delay) to adapt filter coefficients (e.g., filter coefficients 124) in the main adaptive filter (e.g., full rate main adaptive filter 102), and to produce an estimated echo signal (e.g., estimated echo signal 114), and subtract such an estimated echo signal from the send signal (e.g. using adder 116 to produce error signal 120) to reduce or cancel the echo signal, as depicted at 424.

If there has been more than one echo located, the process passes from 408 to 414 wherein the process determines whether one or more pairs of echoes that are close together. In one embodiment, a pair of close echoes can be defined as two echo signals occurring within the time span of a subsegment. If pairs of echoes are close together, and can be completely covered by a full rate main adaptive filter length (provided the filter is properly located) the process determines the pure delay corresponding to the minimum time of the pair of echoes (e.g., the time of the first occurring echo of the pair of echoes). For example, if the full rate main adaptive filter length is 24 ms (e.g., having 192 taps and assuming a 8000 Hz sample rate), and two distinct echoes are separated by 10 ms (e.g., two local maximum values or peaks of subsegment coefficients are 10 ms apart), the main filter may be properly positioned so that both echo signals can be canceled by the estimated echo signal output by the full rate main adaptive filter. This scenario can also assume that both echoes under consideration have "reasonable" tail lengths (e.g., they do not spread over exceptionally long time segments). As set forth in ITU-T Recommendation G.168, a reasonable tail length for the echo signal is from 8 to 16 ms, with tails having relatively small magnitudes. In general, based on an echo signal's waveform and energy distribution, and also based on engineering knowledge of hybrid circuit characteristics, an echo path impulse response domain containing single echoes or reflections can be comfortably covered by filter lengths of approximately 4 ms to 20 ms, depending on the particular case and network scenarios.

After determining the pure delay, the process sets the pure delay for the main adaptive filter, as shown at 418. In one embodiment, this can be implemented by passing a pure delay value 126 from filter coefficient analysis system 130 to dynamic pure delay 104 (see FIG. 1).

If more than one echo has been detected, and the echoes are not close together, the process passes from 414 to 420, wherein the process can determine multiple pure delays for multiple echoes. Note that a full rate main adaptive filter should be able to use more than one pure delay when multiple pure delays are sent for use by the full rate main adaptive filter. An embodiment that uses a full rate main adaptive filter designed to receive multiple pure delays is shown in FIG. 3.

After setting multiple pure delays for the main adaptive filter, the process uses the delayed receive signals in the full rate main adaptive filters to filter the multiple echo signals, as shown at 424. Thereafter, the process iteratively returns to 404, wherein subsegment coefficients for each subsegment adaptive filter are once again adapted.

Although the invention is described herein with reference to specific embodiments, various modifications and changes can be made without departing from the scope of the present invention as set forth in the claims below. For example, while the techniques and apparatus for reducing an echo signal may vary widely, one or more embodiments can be used in public switched telephone networks, wireless networks, Internet networks, and cellular networks. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

ADDITIONAL TEXT

1. A method for estimating a delay of an echo signal comprising:
   partitioning an echo path coverage time into a first subsegment and a second subsegment;
   adapting a first filter having first coefficients to estimate a response of a connected system with respect to the first subsegment;
   adapting a second filter having second coefficients to estimate a response of the connected system with respect to the second subsegment; and
   in response to the first coefficients and the second coefficients, estimating a pure delay of the echo signal for use in echo reduction.

2. The method for estimating the delay of an echo signal according to claim 1 wherein the adapting the second filter comprises adapting the second filter in parallel with the adapting the first filter.

3. The method for estimating the delay of an echo signal according to claim 1 wherein the first subsegment partially overlaps the second subsegment.

4. The method for estimating the delay of an echo signal according to claim 1 wherein the first and second filters are adaptive finite impulse response (FIR) filters.

5. The method for estimating the delay of an echo signal according to claim 1 wherein the adapting the first filter comprises adapting the first filter to estimate the response of the connected system with respect to the first subsegment using reduced rate data.

6. The method for estimating the delay of an echo signal according to claim 1 wherein the estimating the pure delay comprises:
   selecting one or more selected coefficients of the first coefficients and the second coefficients that indicate an echo; and
   estimating a pure delay associated with the selected coefficients.

7. The method for estimating the delay of an echo signal according to claim 6 wherein the estimating the pure delay associated with the selected coefficients comprises
estimating a first pure delay associated with first selected coefficients that indicate a first echo; and
estimating a second pure delay associated with second selected coefficients that indicate a second echo.

8. The method for estimating the delay of an echo signal according to claim 6 wherein the estimating the pure delay associated with the selected coefficients comprises subtracting an offset from a delay correlated with the selected coefficients.

9. The method for estimating the delay of an echo signal according to claim 8 wherein the subtracting an offset comprises subtracting an offset related to values of the first coefficients and the second coefficients.

10. A system for reducing an echo signal comprising:
    a first subsegment adaptive filter coupled to a receive signal delayed by a first delay and a send signal, wherein the first subsegment adaptive filter adapts a first set of coefficients in response to the receive signal delayed by the first delay and the send signal;
    a second subsegment adaptive filter coupled to the receive signal delayed by a second delay and the send signal, wherein the second subsegment adaptive filter adapts a second set of coefficients in response to the receive signal delayed by the second delay and the send signal;
    a filter coefficient analysis system coupled to the first and second subsegment adaptive filters for estimating a pure delay in response to the first and second sets of coefficients;
    a dynamic pure delay coupled to the filter coefficient analysis system and the receive signal, wherein the dynamic pure delay delays the receive signal in response to the pure delay to produce a delayed receive signal;
    a main adaptive filter having an input coupled to the dynamic pure delay for receiving the delayed receive signal, an input coupled to an error signal, and having an estimated echo output; and
    an adder having an input coupled to the estimated echo output and an input coupled to the send signal, and having an output for outputting the error signal, wherein the main adaptive filter adapts to reduce an echo signal in the error signal.

11. The system for reducing an echo signal according to claim 10 further comprising a first subsegment delay and a second subsegment delay, wherein the first and second subsegment delays each have an input coupled to the receive signal, wherein the first subsegment delay has an output coupled to the first subsegment adaptive filter for providing the receive signal delayed by the first delay, and wherein the second subsegment delay has an output coupled to the second subsegment adaptive filter for providing the receive signal delayed by the second delay.

12. The system for reducing an echo signal according to claim 10 wherein the first subsegment adaptive filter has a first length and the second subsegment adaptive filter has a second length, and wherein the first length and the first delay define a first subsegment of an echo path impulse response domain, and the second length and the second delay define a second subsegment of the echo path impulse response domain, and wherein the first subsegment of the echo path impulse response domain partially overlaps the second subsegment of the echo path impulse response domain.

13. The system for reducing an echo signal according to claim 10 wherein the first subsegment adaptive filter coupled to the receive signal delayed by the first delay and the send signal comprises a first subsegment adaptive filter coupled to a send signal decimator for providing a decimated send signal, and coupled to a first receive signal delay that is coupled to a receive signal decimator for providing a decimated receive signal delayed by the first delay, and wherein the second subsegment adaptive filter coupled to the receive signal delayed by the second delay and the send signal comprises a second subsegment adaptive filter coupled to the send signal decimator, and coupled to a second receive signal delay that is coupled to the receive signal decimator for providing a decimated receive signal delayed by the second delay.

14. The system for reducing an echo signal according to claim 10 wherein the second adaptive filter comprises two subsegment adaptive filters, each coupled to the receive signal delayed by different delays, and each having an input coupled to a subsegment error signal, and wherein outputs of the two subsegment adaptive filters are added together to produce the subsegment error signal.

15. A method for reducing an echo signal comprising:
    assigning a subsegment delay to each of a plurality of subsegment adaptive filters; coupling a send signal and a delayed receive signal to each of the plurality of subsegment adaptive filters, wherein the delayed receive signal is delayed according to a respective subsegment delay;
    in parallel, adapting a set of filter coefficients in each of the plurality of subsegment adaptive filters to correspond to a respective subsegment impulse response of a system having an input coupled to the receive signal and an output coupled to the send signal;
    analyzing each set of filter coefficients and producing a pure delay;
    using the pure delay to delay the receive signal for a main adaptive filter;
    producing an echo signal replica using the main adaptive filter and an error signal; and
    subtracting the echo signal replica from the send signal to produce the error signal.

16. The method for reducing an echo signal according to claim 15 wherein the assigning the subsegment delay to each of the plurality of subsegment adaptive filters comprises assigning a subsegment delay to each of a plurality of subsegment adaptive filters, wherein selected pairs of the subsegment delays partially overlap.

17. The method for reducing an echo signal according to claim 15 wherein the coupling the send signal and the delayed receive signal to each of the plurality of subsegment adaptive filters comprises coupling a decimated send signal and a decimated delayed receive signal to each of the plurality of subsegment adaptive filters.

18. The method for reducing an echo signal according to claim 15 wherein the adapting the set of filter coefficients in each of the plurality of subsegment adaptive filters comprises adapting a set of filter coefficients in each of a plurality of subsegment finite impulse response (FIR) adaptive filters, wherein each subsegment FIR adaptive filter has a length corresponding to a respective subsegment of an echo path impulse response.

19. The method for reducing an echo signal according to claim 15 wherein the analyzing each set of filter coefficients and producing a pure delay comprises distinguishing selected coefficients adapted to the echo signal and producing a pure delay in response to the selected coefficients.

20. The method for reducing an echo signal according to claim 15 wherein the analyzing each set of filter coefficients and producing a pure delay comprises:
    distinguishing selected coefficients adapted to a first echo signal;
    distinguishing selected coefficients adapted to a second echo signal;
    producing a first pure delay in response to the selected coefficients adapted to the first echo signal; and
    producing a second pure delay in response to the selected coefficients adapted to the second echo signal.

What is claimed is:

1. A method for estimating a delay of an echo signal comprising:
    partitioning an echo path coverage time into a first subsegment and a second subsegment;
    adapting a first filter having first coefficients to estimate a response of a connected system with respect to the first subsegment;
    adapting a second filter having second coefficients to estimate a response of the connected system with respect to the second subsegment; and
    in response to the first coefficients and the second coefficients, estimating a pure delay of the echo signal for use in echo reduction.

2. The method for estimating the delay of an echo signal according to claim 1 wherein the adapting the second filter comprises adapting the second filter in parallel with the adapting the first filter.

3. The method for estimating the delay of an echo signal according to claim 1 wherein the first subsegment partially overlaps the second subsegment.

4. The method for estimating the delay of an echo signal according to claim 1 wherein the first and second filters are adaptive finite impulse response (FIR) filters.

5. The method for estimating the delay of an echo signal according to claim 1 wherein the adapting the first filter comprises adapting the first filter to estimate the response of the connected system with respect to the first subsegment using reduced rate data.

6. The method for estimating the delay of an echo signal according to claim 1 wherein the estimating the pure delay comprises:
    selecting one or more selected coefficients of the first coefficients and the second coefficients that indicate an echo; and
    estimating a pure delay associated with the selected coefficients.

7. The method for estimating the delay of an echo signal according to claim 6 wherein the estimating the pure delay associated with the selected coefficients comprises
    estimating a first pure delay associated with first selected coefficients that indicate a first echo; and
    estimating a second pure delay associated with second selected coefficients that indicate a second echo.

8. The method for estimating the delay of an echo signal according to claim 6 wherein the estimating the pure delay associated with the selected coefficients comprises subtracting an offset from a delay correlated with the selected coefficients.

9. The method for estimating the delay of an echo signal according to claim 8 wherein the subtracting an offset comprises subtracting an offset related to values of the first coefficients and the second coefficients.

10. A system for reducing an echo signal comprising:
    a first subsegment adaptive filter coupled to a receive signal delayed by a first delay and a send signal, wherein the first subsegment adaptive filter adapts a first set of coefficients in response to the receive signal delayed by the first delay and the send signal;
    a second subsegment adaptive filter coupled to the receive signal delayed by a second delay and the send signal, wherein the second subsegment adaptive filter adapts a second set of coefficients in response to the receive signal delayed by the second delay and the send signal;

a filter coefficient analysis system coupled to the first and second subsegment adaptive filters for estimating a pure delay in response to the first and second sets of coefficients;

a dynamic pure delay coupled to the filter coefficient analysis system and the receive signal, wherein the dynamic pure delay delays the receive signal in response to the pure delay to produce a delayed receive signal;

a main adaptive filter having an input coupled to the dynamic pure delay for receiving the delayed receive signal, an input coupled to an error signal, and having an estimated echo output; and an adder having an input coupled to the estimated echo output and an input coupled to the send signal, and having an output for outputting the error signal, wherein the main adaptive filter adapts to reduce an echo signal in the error signal.

11. The system for reducing an echo signal according to claim 10 further comprising a first subsegment delay and a second subsegment delay, wherein the first and second subsegment delays each have an input coupled to the receive signal, wherein the first subsegment delay has an output coupled to the first subsegment adaptive filter for providing the receive signal delayed by the first delay, and wherein the second subsegment delay has an output coupled to the second subsegment adaptive filter for providing the receive signal delayed by the second delay.

12. The system for reducing an echo signal according to claim 10 wherein the first subsegment adaptive filter has a first length and the second subsegment adaptive filter has a second length, and wherein the first length and the first delay define a first subsegment of an echo path impulse response domain, and the second length and the second delay define a second subsegment of the echo path impulse response domain, and wherein the first subsegment of the echo path impulse response domain partially overlaps the second subsegment of the echo path impulse response domain.

13. The system for reducing an echo signal according to claim 10 wherein the first subsegment adaptive filter coupled to the receive signal delayed by the first delay and the send signal comprises a first subsegment adaptive filter coupled to a send signal decimator for providing a decimated send signal, and coupled to a first receive signal delay that is coupled to a receive signal decimator for providing a decimated receive signal delayed by the first delay, and wherein the second subsegment adaptive filter coupled to the receive signal delayed by the second delay and the send signal comprises a second subsegment adaptive filter coupled to the send signal decimator, and coupled to a second receive signal delay that is coupled to the receive signal decimator for providing a decimated receive signal delayed by the second delay.

14. The system for reducing an echo signal according to claim 10 wherein the second adaptive filter comprises two subsegment adaptive filters, each coupled to the receive signal delayed by different delays, and each having an input coupled to a subsegment error signal, and wherein outputs of the two subsegment adaptive filters are added together to produce the subsegment error signal.

15. A method for reducing an echo signal comprising:
assigning a subsegment delay to each of a plurality of subsegment adaptive filters;
coupling a send signal and a delayed receive signal to each of the plurality of subsegment adaptive filters, wherein the delayed receive signal is delayed according to a respective subsegment delay;
in parallel, adapting a set of filter coefficients in each of the plurality of subsegment adaptive filters to correspond to a respective subsegment impulse response of a system having an input coupled to the receive signal and an output coupled to the send signal;
analyzing each set of filter coefficients and producing a pure delay;
using the pure delay to delay the receive signal for a main adaptive filter;
producing an echo signal replica using the main adaptive filter and an error signal; and
subtracting the echo signal replica from the send signal to produce the error signal.

16. The method for reducing an echo signal according to claim 15 wherein the assigning the subsegment delay to each of the plurality of subsegment adaptive filters comprises assigning a subsegment delay to each of a plurality of subsegment adaptive filters, wherein selected pairs of the subsegment delays partially overlap.

17. The method for reducing an echo signal according to claim 15 wherein the coupling the send signal and the delayed receive signal to each of the plurality of subsegment adaptive filters comprises coupling a decimated send signal and a decimated delayed receive signal to each of the plurality of subsegment adaptive filters.

18. The method for reducing an echo signal according to claim 15 wherein the adapting the set of filter coefficients in each of the plurality of subsegment adaptive filters comprises adapting a set of filter coefficients in each of a plurality of subsegment finite impulse response (FIR) adaptive filters, wherein each subsegment FIR adaptive filter has a length corresponding to a respective subsegment of an echo path impulse response.

19. The method for reducing an echo signal according to claim 15 wherein the analyzing each set of filter coefficients and producing a pure delay comprises distinguishing selected coefficients adapted to the echo signal and producing a pure delay in response to the selected coefficients.

20. The method for reducing an echo signal according to claim 15 wherein the analyzing each set of filter coefficients and producing a pure delay comprises:
distinguishing selected coefficients adapted to a first echo signal;
distinguishing selected coefficients adapted to a second echo signal;
producing a first pure delay in response to the selected coefficients adapted to the first echo signal; and
producing a second pure delay in response to the selected coefficients adapted to the second echo signal.

* * * * *